United States Patent [19]
Torregrossa

[11] Patent Number: 5,910,977
[45] Date of Patent: *Jun. 8, 1999

[54] DEVICE FOR TESTING TELECOMMUNICATION TERMINALS, IN PARTICULAR MOBILE RADIO TERMINALS, AND TELECOMMUNICATION TERMINAL ADAPTED TO BE TESTED BY MEANS OF A DEVICE OF THIS KIND

[75] Inventor: Philippe Torregrossa, Origne, France

[73] Assignee: Alcatel Mobile Phones, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/551,426

[22] Filed: Nov. 1, 1995

[30] Foreign Application Priority Data

Nov. 9, 1994 [FR] France .................................. 94 13465

[51] Int. Cl.$^6$ ........................... H04M 1/24; H04B 17/00; H04J 1/16
[52] U.S. Cl. ........................... 379/29; 455/425; 370/251
[58] Field of Search ................................ 379/1, 5, 6, 27, 379/28, 29, 58, 59, 60, 61; 370/13, 58.2, 99.1, 242, 244, 247, 249, 251, 397; 324/590, 763; 375/224; 455/33.1, 33.2, 67.1

[56] References Cited

U.S. PATENT DOCUMENTS

| | | | |
|---|---|---|---|
| 5,197,062 | 3/1993 | Picklesimer | 370/242 |
| 5,267,230 | 11/1993 | Krishna et al. | 370/13 |
| 5,353,327 | 10/1994 | Adari et al. | 379/29 |
| 5,446,781 | 8/1995 | Lindstrom et al. | 379/27 |
| 5,481,544 | 1/1996 | Baldwin et al. | 370/94.1 |
| 5,572,160 | 11/1996 | Wadell | 324/763 |

OTHER PUBLICATIONS

Picken, D., "Measuring of Digital Mobile Radio", *Funkschau*, vol. 63, No. 21, Oct. 4, 1991, pp. 47–50, XP 000264608.

M. Ono, "European GSM Requires Adequate Measuring Instruments", *JEE Journal of Electronic Engineering*, vol. 27, No. 279, Mar. 1990, Tokyo, Japan, pp. 28–31, XP 000115639.

Patent Abstracts of Japan, vol. 17, No. 706 (E–1483) Dec. 22, 1993 corresponding to JP-A-52 044054 (Matshushita) Mar. 21, 1993.

*Primary Examiner*—Paul Loomis
*Attorney, Agent, or Firm*—Sughrue, Mion, Zinn Macpeak & Seas, PLLC

[57] ABSTRACT

A device for testing telecommunication terminals for telecommunication systems, in particular mobile radio systems, of the multiple access type, using a particular multiplex structure, transmits test information between the test device and a plurality of terminals under test by multiplexing in accordance with this multiplex structure.

11 Claims, 2 Drawing Sheets

DEVICE FOR TESTING TELECOMMUNICATION TERMINALS, IN PARTICULAR MOBILE RADIO TERMINALS, AND TELECOMMUNICATION TERMINAL ADAPTED TO BE TESTED BY MEANS OF A DEVICE OF THIS KIND

BACKGROUND OF THE INVENTION

1. Field of the Invention

The present invention concerns testing telecommunication terminals, in particular mobile radio terminals.

The present invention concerns in particular a test to be carried out during manufacture to check the transmission quality of the transmit and receive subsystems of these terminals.

The principle of a test of this kind is to generate test information that is transmitted to the terminal under test, received and processed by the receive subsystem of the terminal and then retransmitted by the transmit subsystem of the terminal to the test equipment which then carries out various measurements (power level, error rate, etc) intended to compare the information it receives with the information it transmitted, in order to evaluate said transmission quality. The type of measurements to be carried out is usually covered by standards; in the case of GSM (Global System for Mobile communications) type mobile terminals, for example, the measurements are defined in GSM Recommendation 11.10.

2. Description of the Prior Art

Various designs of test equipment, in particular for testing GSM type mobile terminals, are already available.

We have addressed ourselves to what we regard a drawback of such test equipment, namely that the same test equipment cannot test more than one terminal at a time. Such test equipment may be referred to as single terminal test equipment (STTE).

SUMMARY OF THE INVENTION

An aim of the present invention is therefore to make the test operation more economical by enabling the same test equipment to test more than one terminal at a time (i.e., multiple terminal test equipment or MTTE), and to achieve this without significantly increasing the complexity of the test device.

The present invention applies to terminals for multiple access telecommunication systems. By "multiple access telecommunication system" we mean a telecommunication system in which transmission resources are shared to enable multiple simultaneous calls on different channels, using frequency-division multiplexing (frequency-division multiple access—FDMA) or time-division multiplexing (time-division multiple access—TDMA) or code-division (code-division multiple access—CDMA). The present invention applies in particular to time-division multiple access systems such as the GSM system previously mentioned.

The present invention essentially consists in a device for testing telecommunication terminals for telecommunication systems, in particular mobile radio systems, of the multiple access type, using a particular multiplex structure, which device includes means for transmitting test information between said test device and a plurality of terminals under test by multiplexing in accordance with said multiplex structure.

The present invention also consists in a telecommunication terminal adapted to be tested by means of a device of the above kind.

Other aims and features of the present invention will emerge from a reading of the following description of embodiments of the invention with reference to the appended drawings.

DETAILED DESCRIPTION OF THE PREFERRED EMBODIMENTS

The present invention applies to terminals for time division multiple access telecommunication systems using a particular time division multiplex structure.

A time division multiplex structure is made up of successive frames each comprising various time slots (eight time slots in the GSM system, for example) allocated to respective different calls to be set up simultaneously by the system.

The invention uses a time division multiplex structure of this kind to test more than one terminal (i.e. at least two terminals) simultaneously using the same test device.

Figure 1:
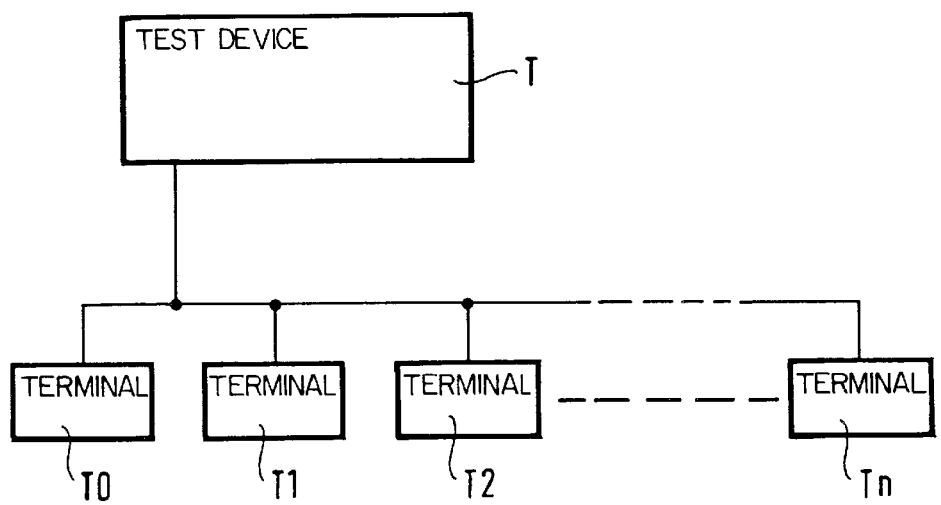
FIG. 1 is a diagram showing a test configuration obtained in accordance with the present invention.

A test configuration of this kind is shown in FIG. 1, which shows the test device T and n terminals T0, T1, . . . , Tn to be tested simultaneously using this test device. The test device and the terminals are connected by a wired link, for example, which in the case of mobile radio terminals, for example, is an RF link.

Figure 2:
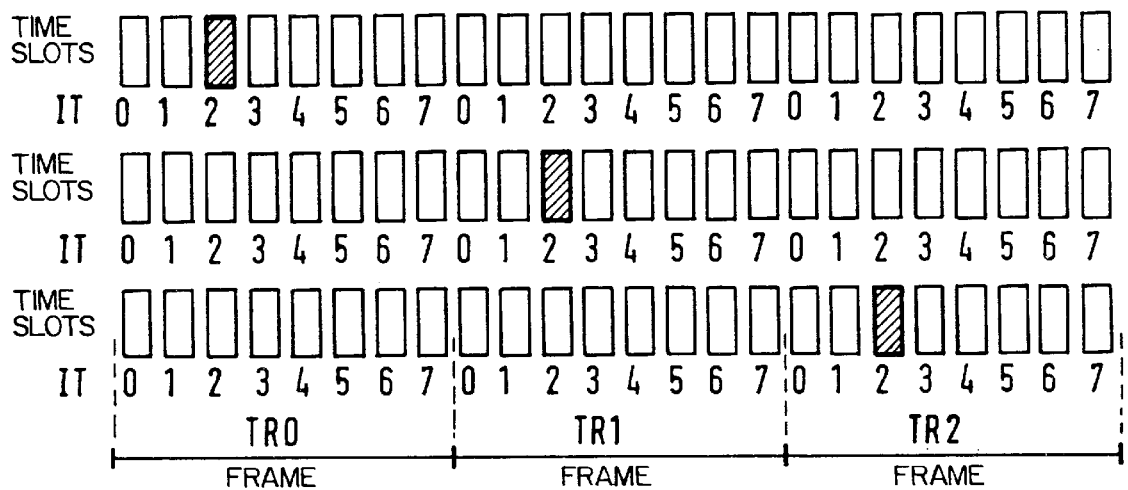
FIG. 2 shows one example of time division multiplexing in accordance with the invention of test information relating to a plurality of terminals under test.

According to a first embodiment, shown in FIG. 2, test information relating to a plurality of terminals under test is multiplexed by assigning the various terminals under test respective different frames of said time division multiplex structure, the time slots allocated to the various terminals under test in these various frames being either the same or different.

In the embodiment shown in FIG. 2, three successive frames TR0 through TR2 each include eight time slots IT0 through IT7, for example, and, for each of the n terminals under test (with n=3, for example), corresponding to one row of the diagram, the time slots assigned to that terminal are shown shaded.

In this embodiment, time slot IT2 of the first frame TR0 is assigned to the terminal under test T0, time slot IT2 of the second frame TR1 is assigned to the terminal under test T1 and time slot IT2 of the third frame TR2 is assigned to the terminal under test T2.

According to a possible arrangement, not specifically shown, the test information relating to n terminals under test would be multiplexed by assigning different time slots of the same frame to the different terminals under test. Compared to this alternative, however, the embodiment shown in FIG. 2 reduces the processing power that is required of the test device, and thus limits the increase in the complexity of the MTTE test device compared to the existing structure of an STTE test device.

According to a second embodiment, instead of assigning different frames to different terminals under test, different groups of consecutive frames are assigned to the terminals under test. One particular instance of a group of consecutive frames is a multiframe, in particular a 26-frame multiframe in the case of the GSM system.

A frame defines physical transmission channels or time slots that are time division multiplexed. A multiframe, however, defines "logical" transmission channels (1) defined by the type of information that they carry (namely, traffic information corresponding to information to be transmitted during a call, or signalling information required to set up, maintain, and clear down a call), and (2) between which the physical transmission channels are shared over a particular number of consecutive frames (e.g., over 26 consecutive frames in the case of the "26-frame multiframe" of the GSM system).

The increase in the complexity of the MTTE device compared to an STTE device can be limited if the test device includes variation means for varying the carrier frequency of the information to be transmitted in accordance with the frequency hopping technique that is known in itself.

In a mobile radio system such as the GSM system, the frequency hopping technique implements a form of transmission diversity to compensate for problems encountered in transmission over the radio transmission channel.

The variation means for varying the carrier frequency of the information to be transmitted, although not in principle of benefit for the type of test considered here (concerned with checking the transmission quality of the transmit and receive subsystems of the terminals under test), can be needed for other types of test where it is more a question of simulating the behavior of the telecommunication system in question vis-à-vis the terminals under test. With such variation means, to assign a given frame (or a given group of consecutive frames) to a terminal under test, it is sufficient to vary the carrier frequency of the information to be transmitted from frame to frame (or from group of consecutive frames to group of consecutive frames) and to associate a given carrier frequency with the terminal under test.

Figure 3:
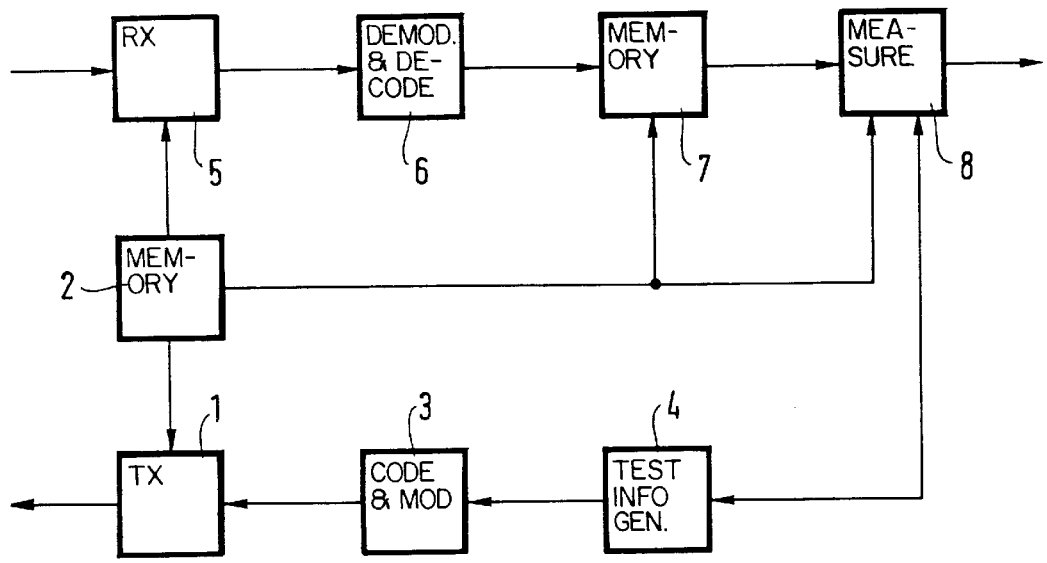
FIG. 3 shows one embodiment of a test device in accordance with the invention.

FIG. 3 is a diagrammatic representation of a test device using this facility.

This device includes:

in the transmit subsystem:
  a radiofrequency transmit stage 1 controlled in accordance with a frequency hopping table stored in a memory 2 that in the example shown in FIG. 2 is read at a rate equal to the frame frequency,
  coding and modulation means 3 for formatting the test information to be applied to the radiofrequency transmit stage 1 in a transmission format acceptable to the telecommunication system concerned,
  a generator 4 of test information relating to the various terminals under test, this generator being caused to select the test information relating to a given terminal by the frequency hopping table stored in the memory 2, in the receive subsystem:
  a radiofrequency receive stage 5 also controlled in accordance with the frequency hopping table stored in the memory 2,
  demodulation and decoding means 6 for recognizing the test information received,
  a memory 7 for storing test information from the demodulation and decoding means 6 relating to the various terminals under test, this memory also being under the control of the frequency hopping table stored in the memory 2 in respect of selecting test information received relating to a given terminal,
  measuring means 8 controlled in the same way as the memory 7, receiving from the memory 7 the test information received and, for comparison with the received test information, the test information transmitted by the test information generator 4 relating to the same terminal under test.

For simplicity, FIG. 3 does not show the features of existing test devices implementing the call set-up and clearing down functions vis-à-vis the terminal under test (with the special meaning of "call" relevant here, i.e. the transmission of test information).

In the example shown in FIG. 2, to enable them to be tested by a test device in accordance with the present invention, the terminals must include inhibiting means for inhibiting the breaking off of a call if the test device transmits test information to a terminal under test only every "n" frames (where "n" is the number of terminals under test simultaneously) and the breaking off a call if a logical transmission channel assigned to them does not contain any information recognized by the terminal in a given repetition period of that logical channel.

Figure 4:
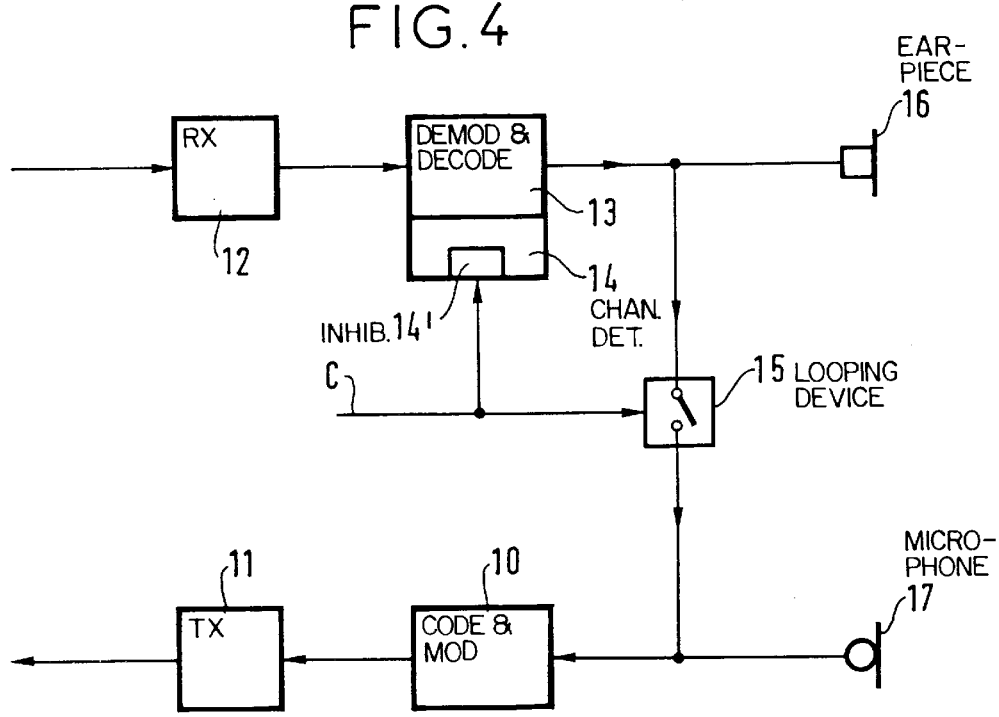
FIG. 4 shows one embodiment of a terminal in accordance with the invention adapted to be tested by means of a test device in accordance with the invention.

FIG. 4 shows a telecommunication terminal including means of this kind.

This terminal includes:

in the transmit subsystem:
  coding and modulation means 10 for formatting the information to be transmitted by the terminal into a transmission format acceptable to the telecommunication system concerned,
  a radiofrequency transmit stage 11 receiving the information from the coding and modulation means 10, in the receive subsystem:
  a radiofrequency receive stage 12,
  demodulation and decoding means 13 for recognizing the information received, associated with means 14 for detecting if a predetermined logical transmission channel assigned to the terminal does not contain any information recognized by the means 13 in a given repetition period of that logical channel and, if this is the case, for activating the means to break off the call in question; in the GSM system, for example, said logical transmission channel is the Slow Associated Control Channel (SACCH) transmitted in the 13th frame of a "26-frame multiframe". The means 14 include means 14' for inhibiting the means for breaking off the call while the terminal is being tested, i.e. while a control signal C is active, means 15, symbolically represented as a switch, for looping the receive subsystem to the transmit subsystem in the terminal when the terminal is under test (i.e. when the control signal C is active) or, otherwise, to feed the information from the receive subsystem to a receive subsystem termination unit such as an earpiece 16, for example, and for feeding to the input of the transmit subsystem the information from a transmit subsystem termination unit such as a microphone 17, for example.

For simplicity, FIG. 4 does not show the means also present in any telecommunication terminal for implementing the conventional call set-up and clearing down functions in relation to that terminal.

There is claimed:

1. A device for testing telecommunication terminals for multiple access telecommunication systems using a given multiplex structure, which device includes means for transmitting test information between said test device and a plurality of terminals under test by multiplexing in accordance with said given multiplex structure, wherein said device links to said terminals under test, thereby enabling a simultaneous test of said terminals, and then performs said simultaneous test without establishing a subsequent link to said terminals under test.

2. A device for testing of mobile radio telecommunication terminals, comprising:

means for transmitting test information between said test device and said terminals by multiplexing in accordance with a predefined multiplex structure;

said multiplex structure being a time division multiplex structure including successive frames each including time slots assigned to respective said terminals communicating via the system, and said means for transmitting test information between said device and said plurality of terminals under test including means for assigning different frames or different groups of consecutive frames of said time division multiplex structure to respective different terminals under test, the time slots assigned in said various frames or in said various groups of consecutive frames to said various terminals under test being the same or different.

3. Device according to claim 2 wherein said groups of consecutive frames are multiframes.

4. Device according to claim 2 wherein said means for assigning different frames or different groups of consecutive frames of said time division multiplex structure to respective different terminals under test include means for varying the carrier frequency of the information to be transmitted from frame to frame or from group of consecutive frames to group of consecutive frames and means for associating a given carrier frequency with a given terminal under test.

5. Mobile radio telecommunication terminal adapted for time division multiple access use with device according to claim 2, using said time division multiplex structure, and including (1) means for breaking off a call involving said terminal when a predetermined logical transmission channel assigned to it in said time division multiplex structure does not contain information recognized by said terminal in a particular repetition period of said logical transmission channel, and (2) means for inhibiting said call breaking off means during testing of said terminal.

6. A radio telecommunications test system for testing multiple-access radio terminals of mobile radio systems, said test system comprising:

a test device having a radio transmit subsystem and a radio receive subsystem;

said transmit subsystem of said test device having means for transmitting first test information to said terminals;

said receive subsystem of said test device having means for receiving second test information from said terminals;

said test device having means for comparing said first with said second test information to provide a test result;

said test device performing multiplex radio communication with said terminals according to a predefined multiplex structure;

said multiplex structure being a time division multiplex structure comprising consecutive frames, each having a respective series of time slots, identically positioned ones of said time slots defining logical transmission channels;

each of said terminals being assigned one of said logical transmission channels;

said test device including assigning means for assigning to each of said terminals a repeating pattern of frames as a respective frame assignment, said pattern including one or more different said consecutive frames.

7. A test system according to claim 6, wherein said terminals are assigned different ones of said logical transmission channels.

8. A test system according to claim 6, wherein said terminals are assigned an identical one of said logical transmission channels.

9. A test system according to claim 8, wherein said pattern is a multiframe.

10. A test system according to claim 8, wherein said assigning means further comprises:

means for varying a carrier frequency of said first test information according to said respective frame assignment; and means for associating a respective carrier frequency with one of said terminals.

11. A test system according to claim 8, wherein each of said terminals comprises:

call breaking off means for breaking off a respective call when an assigned one of said logical transmission channels, within a predefined repetition period, does not contain information recognized by said terminal; and means for inhibiting said call breaking off means from breaking off said call in a terminal test mode.

\* \* \* \* \*